United States Patent
Tilbrook et al.

(10) Patent No.: US 11,702,516 B2
(45) Date of Patent: Jul. 18, 2023

(54) CURATIVE COMPOSITION AND A RESIN COMPOSITION CONTAINING THE CURATIVE COMPOSITION

(71) Applicant: HEXCEL COMPOSITES LIMITED, Duxford (GB)

(72) Inventors: David Allan Tilbrook, Saffron Walden (GB); Christopher Robert Mason, Newmarket (GB); Martin Richard Simmons, Baldock (GB)

(73) Assignee: HEXCEL COMPOSITES LIMITED, Duxford (GB)

( * ) Notice: Subject to any disclaimer, the term of this patent is extended or adjusted under 35 U.S.C. 154(b) by 246 days.

(21) Appl. No.: 16/769,762

(22) PCT Filed: Dec. 20, 2018

(86) PCT No.: PCT/EP2018/086445
§ 371 (c)(1),
(2) Date: Jun. 4, 2020

(87) PCT Pub. No.: WO2019/122272
PCT Pub. Date: Jun. 27, 2019

(65) Prior Publication Data
US 2020/0385536 A1 Dec. 10, 2020

(30) Foreign Application Priority Data
Dec. 21, 2017 (GB) .................................. 1721593

(51) Int. Cl.
| | |
|---|---|
| C08J 3/24 | (2006.01) |
| C08G 59/50 | (2006.01) |
| C08K 9/10 | (2006.01) |
| C08L 63/00 | (2006.01) |
| C08J 5/24 | (2006.01) |
| C08K 5/3445 | (2006.01) |
| C08K 5/13 | (2006.01) |
| C08K 5/09 | (2006.01) |

(52) U.S. Cl.
CPC .............. *C08J 3/241* (2013.01); *C08G 59/50* (2013.01); *C08J 5/243* (2021.05); *C08K 5/09* (2013.01); *C08K 5/13* (2013.01); *C08K 5/3445* (2013.01); *C08K 9/10* (2013.01); *C08L 63/00* (2013.01); *C08J 2363/00* (2013.01)

(58) Field of Classification Search
CPC .......... C08K 5/09; C08K 5/13; C08K 5/3445; C08K 5/3465; C08K 9/10
See application file for complete search history.

(56) References Cited

U.S. PATENT DOCUMENTS

| | | | | |
|---|---|---|---|---|
| 3,499,008 | A * | 3/1970 | Behar | C07C 59/70 548/335.1 |
| 4,756,848 | A * | 7/1988 | Tieke | C23C 26/00 252/514 |
| 5,178,669 | A * | 1/1993 | Watanabe | B41M 5/3335 106/31.18 |
| 2012/0088920 | A1 | 4/2012 | Kaneko et al. | |
| 2013/0158231 | A1 | 6/2013 | Kamegaya et al. | |
| 2017/0073459 | A1 | 3/2017 | Iwaya et al. | |
| 2018/0194979 | A1 * | 7/2018 | Cui | C09J 181/02 |

FOREIGN PATENT DOCUMENTS

| | | | | |
|---|---|---|---|---|
| EP | 0027891 A1 * | 9/1980 | | |
| EP | 554023 A1 * | 8/1993 | ............. | C09D 5/086 |
| EP | 0949286 A1 | 10/1999 | | |
| EP | 2392603 A1 * | 12/2011 | ........... | C07D 221/02 |
| EP | 2980064 A1 | 2/2016 | | |
| JP | 59078168 A * | 5/1984 | | |
| JP | 02188293 A * | 7/1990 | | |
| JP | 4318043 A | 11/1992 | | |
| WO | 2016/087935 A1 | 6/2016 | | |
| WO | 2016/184749 A1 | 11/2016 | | |

OTHER PUBLICATIONS

Kumaresan et al., "Synthesis and XRD Characterization of the Organic Cocrystals, β 62 β β β-Phenylthiopropionic Acid : Caffeine and Benzilic Acid-4,4'-bipyridine," Int'l J. Current Chem. 1(3), 163-174 (Year: 2010).*
Khalili et al., "Does interaction between an amino acid anion and methylimidazolium cation lead to a nanostructured ion pairs of [Mim][AA] as an ionic liquid?", J. Mol. Liquids 229, 267-277 (2017).*
Search Report, issued in a related Great Britain Application, Application No. GB1721593.0, dated Jul. 31, 2018.
International Search Report (ISR) and Written Opinion (WO), issued in the parent Patent Cooperation Treaty (PCT), Application No. PCT/EP2018/086445, dated Mar. 14, 2019.

* cited by examiner

*Primary Examiner* — Kregg T Brooks
(74) *Attorney, Agent, or Firm* — W. Mark Bielawski

(57) ABSTRACT

This invention relates to a curative composition and its use in curing epoxy resins and prepregs, adhesives and moulded materials derived therefrom. The curative composition comprises a clathrate comprising a host component and a guest component, the host comprising a carboxylic acid or ester compounds as defined or phenolphthalin and the guest comprising an imidazole or imidazoline component.

5 Claims, No Drawings

CURATIVE COMPOSITION AND A RESIN COMPOSITION CONTAINING THE CURATIVE COMPOSITION

INTRODUCTION

The present invention relates to a curative composition and a resin composition and materials containing the curative composition, particularly but not exclusively to a latent curative composition containing a host component and a guest component that can be used as a curative composition in resin matrix compositions in moulding compounds, adhesives and prepregs. The invention further relates to such compositions and articles made therefrom.

BACKGROUND

Composite materials are produced in many forms. A fibrous layer impregnated with a curable resin matrix formulation is known herein as a prepreg. Moulding compounds generally comprise a fibrous material in a chopped, isotropic or quasi-isotropic form in combination with a resin matrix formulation. The resin matrix formulations in these materials may be uncured or partially cured.

Resin matrix formulations can be selected from a wide range of polymerisable components and additives. Common polymerisable components comprise epoxies, polyesters, vinylester, polyisocyanates, and phenolics. Formulations containing these components are generally referred to as epoxy, polyester, vinylester, polyisocyanate and phenolic formulations respectively.

Epoxy resin formulations are widely used in composite materials. The epoxy components in these formulations are selected from a wide range of epoxy containing materials according to the cure cycle to be employed and the nature of the finished article to be produced. Epoxy resins can be solid, liquid or semi-solid and are characterised by their functionality and epoxy equivalent weight. The functionality of an epoxy resin is the number of reactive epoxy sites per molecule that are available to react and cure to form the cured structure. For example, a bisphenol-A epoxy resin has a functionality of 2, while certain glycidyl amines can have a functionality of more than 4. The reactivity of an epoxy resin is indicated by its epoxy equivalent weight (EEW), the lower the EEW the higher the reactivity. The EEW is the weight of epoxy resin material in grams containing 1 gram/mol of epoxy groups.

The properties required of a composite material are that when cured it has the required glass transition temperature (Tg), and also has the required mechanical properties according to the use to which it is to be put. In certain applications it is important that the Tg is retained under damp or humid conditions.

Epoxy formulations also include catalysts and/or curatives, and these are also selected according to the nature of the epoxy resin, the product to be produced and the cure cycle that is required.

The curing of composite materials to support high volume manufacturing rates requires very short cure cycles. A cure cycle of 2.5 minutes can provide for rate manufacture of ca. 166000 parts per mould per year (assuming a 30 second unload-re loading time and 95% utilisation). It is desirable to use thermosetting materials for structural components as they have superior mechanical performance and creep resistance compared to thermoplastics. For these applications, the thermosetting matrix must have an initial cured Tg that is high enough to allow demoulding at the cure temperature.

A higher cured Tg capability enables curing at higher cure temperature; higher cure temperature will enable faster cure cycles as reactivity increases with temperature.

Very fast cure at lower temperature can be achieved with two component mixed epoxy formulations which are prepared in situ and injected into a fibrous preform, a process known as resin transfer molding (RTM). However this requires additional mixing and metering equipment which increases the complexity and therefore the occurrence of failures which can be costly in high volume production environments. In addition, RTM processes require the construction, in an additional prior step, of a dry fibrous preform. This dry preform can be time consuming to produce and difficult to position accurately into the required complex shaped mould.

Therefore moulding materials that comprise both the fibrous reinforcement and the resin composition matrix and that can exist fully formulated and mixed with several weeks of latency or outlife without the need for refrigeration are advantageous for composite parts manufacture. Such moulding materials can be cut, oriented and stacked in automated processes allowing easy placement into the mould for curing.

In matrix formulations for composite moulding materials, imidazole based curatives are widely used as they react readily with epoxy resins to form a cured epoxy resin matrix. Unfortunately, these curatives are very reactive so mixed solutions of epoxy resin and these curatives have the problem that they show an early on-set of curing and cannot be used as a single-component epoxy resin composition which is manufactured and then delivered at the point of use because these compositions would thicken, gel and cure in transit or in storage.

To overcome this problem, imidazoles have been added to hydroxybenzoic acid to form a salt. The salt has been added as a curative to epoxy resin compositions to reduce the speed of cure (see JP 4-2638).

Curatives have also been devised in the form of a clathrate of a host compound and an imidazole curative. For example, WO 2008/075427 discloses a curable resin composition using a clathrate component of an isophthalic acid-based host compound and an imidazole as guest compound. US 20120088920 discloses curable epoxy resin composition in which the curative uses a clathrate based on carboxylic acids and imidazoles. US 20100179250 discloses host compounds in the form of mono carboxylic acids in which the carboxyl group is directly linked to the aromatic group and WO 2016/087935 also discloses the use of clathrates based on various carboxylic acids in combination with imidazole curatives.

The known clathrates as curatives for epoxy formulations do not have the desired onset of curing and outlife while also providing the desired glass transition temperature (Tg) and retention of glass transition temperatures for the cured formulated epoxy matrix formulations.

Also, known curing clathrates are expensive to manufacture and this has prevented them from being widely used for high volume applications of composite matrix formulations in a wide range of applications including wind energy, automotive and marine applications.

The present inventions aim to obviate or at least mitigate the above described problems and/or to provide improvements generally.

One object of the present inventions is to provide a curable epoxy resin composition containing an epoxy resin, wherein the composition has excellent storage stability, enhanced curing characteristics and provides a cured product having excellent mechanical properties.

SUMMARY OF THE INVENTION

According to the invention there is provided a curative composition, a formulation, a use, a process and a moulding material as defined in any one of the accompanying claims.

The present inventors have found that the above objectives can be solved by providing A clathrate composition containing a host component (A) and a guest component (B),
 i. the host component (A) being defined by the formula (I):

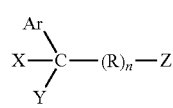

[I]

where n is 0 or 1
Ar is an optionally substituted aryl group
X is independently selected from H, OH, an optionally substituted alkyl group and an optionally substituted aryl group;
Y is independently selected from H, OH, an aryl group, an optionally substituted alkyl group, an optionally substituted aryl group and, taken together with Z, —C(=O)O- which forms a ring with C and R in formula I;
R is a divalent optionally substituted hydrocarbyl group
Z is selected from: 1) C(=O)O—R' wherein R' is selected from hydrogen, an optionally substituted hydrocarbyl group; and 2) a ring structure including Y and C or the host component (A) is a phenolphthalin and
 ii. the guest component (B) comprising a curative.

In the context of this invention, a curative is a compound which is adapted to initiate or advance a polymerisation reaction of a polymerisable resin. The term curative includes accelerators which are chemical compounds which enhance the polymerisation reaction (or "curing") and curative agents which are chemical compounds which initiate the polymerisation reaction of a polymerisable resin.

The curative may include a curative agent, an accelerator or both of these compounds.

The curative is released from the clathrate by a triggered release which may be chemical, physical or a combination of both.

The chemical release may comprise a release which affects the interactions between the host component (A) and the guest component (B) by chemically altering the composition of one or both of the components.

The physical release may comprise a release which affects the interactions between the host component (A) and the guest component (B) without chemically altering the composition of the each of the components. An example of a physical release is dissolution of the host component (A), an increase in temperature, a phase change of the host component (A), dissolution or radiation.

The interactions between the host component (A) and the guest component (B) are preferably non-covalent bonds which enable the host and guest components to form a clathrate. The guest (B) and host (A) components are then released through a physical release. The clathrate preferably has a crystalline structure as can be determined by X-ray diffraction.

We have found that clathrates based on a host compound comprising carboxylic acids and/or an esters containing an aromatic group which is linked to the carboxylic group or ester group by a divalent hydrocarbyl group and/or based on phenolphthalin as a host compound containing a curative as a guest compound are particularly suitable for curing resins particularly in one component matrix systems. The use of such clathrates to provide curatives has been found to provide resin formulations having good control of cure conditions together with a long time until onset of curing at ambient temperature (known as outlife) and provides cured resins of high glass transition temperature (Tg) with good Tg retention. Examples of divalent optionally substituted hydrocarbyl groups ® include but are not limited to divalent aromatic groups or divalent aliphatic groups.

According to another aspect of the invention there is provided a curative composition containing a clathrate containing a host component (A) and a guest component (B),
 i. the host component (A) being defined by the formula as defined above
 ii. the guest component (B) being selected from at least one compound selected from the group consisting of a compound represented by formula:

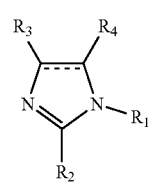

(II)

in which $R_1$ represents a hydrogen atom, a $C_1$-$C_{10}$ alkyl group, an aryl group, an arylalkyl group, or a cyanoethyl group, and $R_2$ to $R_4$ each independently represent a hydrogen atom, a nitro group, a halogen atom, a $C_1$-$C_{20}$ alkyl group, a $C_1$-$C_{20}$ alkyl group substituted with a hydroxy group, an aryl group, an arylalkyl group, or a $C_1$-$C_{20}$ acyl group; and a part with a dashed line represents a single bond or a double bond, and diazabicycloalkanes (DBCA) such as [1,8-diazabicyclo [5.4.0]undecene-7, 1,4-diazabicyclo[2.2.2]octane and 1,5-diazabicyclo[4.3.0]non-5-ene.]

We have found that the use of such a clathrate to provide a curing agent and/or a curing accelerator of thermoset resins, preferably epoxy resins, provides a curative having a selected temperature onset cure and therefore allows long term storage of one-component resin matrix systems containing highly reactive curatives.

The host component (A) preferably contains a single carboxylic acid group or carboxylic acid ester in the components forming the clathrate structure as defined by the previous formula.

In another embodiment, X may be a substituted aryl group such as a hydroxyphenyl or an aminophenyl. This is preferred since the hydroxyl or amino groups can also react with curatives such as imidazolines to form clathrates.

In another embodiment of the invention the mol ratio of component (A) to component (B) is in the range of from 0.5 to 2, preferably 0.7 to 1.7, more preferably from 0.9 to 1.5 and more preferably from 0.95 to 1.4 or from 0.95 to 1.1 and/or combinations of these ratios.

The clathrate composition can be used to provide a resin composition having an improved outlife whilst providing a cured resin having a desired glass transition temperature ($T_g$) when used as a curative for the thermoset resin components.

The invention further provides a process for manufacturing a clathrate comprising the steps of providing a host component (A) and a guest component (B), i. the host component (A) being defined by the formula (I):

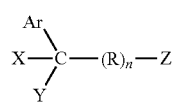
[I]

where n is 0 or 1
Ar is an optionally substituted aryl group
X is independently selected from H, OH, an optionally substituted alkyl group and an optionally substituted aryl group;
Y is independently selected from H, OH, an aryl group, an optionally substituted alkyl group, an optionally substituted aryl group;
R is a divalent optionally substituted hydrocarbyl group and
Z is selected from: 1) C(=O)O—R' wherein R' is selected from hydrogen, an optionally substituted hydrocarbyl group; and 2) a ring structure including Y and C
or the host component (A) is a phenolphthalin and
the guest component (B) comprising a curative; mixing the host component (A) and the guest component (B) in an organic solvent, followed by refluxing the solution and extracting a precipitate containing the clathrate.

In an embodiment of this aspect, the organic solvent is selected from methyl ethyl ketone (MEK), acetone, methanol, ethyl acetate, dicholoromethane or toluene.

In further embodiments of the inventions there are provided a resin formulation comprising the curative compositions in combination with at least one resin component such as an epoxy, polyisocyante and a phenolic resin particularly an epoxy resin. The resin formulation is preferably in the form of a one-component resin formulation which does not require mixing of components before its use. Such a resin formulation includes all components necessary to complete curing of the formulation without requiring additional mixing of other curative or accelerator components.

In another embodiment, there is provided a resin formulation comprising a curative, a resin component and a clathrate composition comprising a host component (A) and a guest component (B), the guest component (B) being a cure accelerator to enhance the curing reaction of the curative. The formulation preferably comprises a epoxy resin component, the curative comprises a hydrazide based curative such as adipic dihydrazide (ADH) or vinyl dihydrazide (VDH), and the guest component (B) may be an imidazole or imidazoline based component which acts as an accelerator in combination with the hydrazide based curative. In a further embodiment of the invention there is provided a curable composition comprising the resin formulation as herein described. Resin formulations may be used in a host of applications: composite materials, coatings, gel coats, adhesives and laminates. The curable composition may comprise additional resin components, fillers, and/or impact modifiers. The composition may be used as a gel coat, adhesive, binder or filler. In a further embodiment there is provided a moulding material comprising a reinforcement material and resin formulation as herein described and articles made from such moulding materials.

Specific Description

Various embodiments of the inventions will now be discussed.

The present invention is based on the finding that a clathrate can be formed from blending in an organic solvent a specific host component (A) such as a carboxylic acid compound represented by

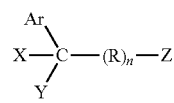
[I]

where n is 0 or 1
Ar is an optionally substituted aryl group
X is independently selected from H, OH, an optionally substituted alkyl group and an optionally substituted aryl group;
Y is independently selected from H, OH, an aryl group, an optionally substituted alkyl group, an optionally substituted aryl group;
R is a divalent optionally substituted hydrocarbyl group and
Z is selected from: 1) C(=O)O—R' wherein R' is selected from hydrogen, an optionally substituted hydrocarbyl group; and 2) a ring structure including Y and C or the host component (A) is a phenolphthalin
and a curative compound having an amino group. Imidazole based and imidazoline based curative compounds are particularly suited.

In a further embodiment there is provided a curable epoxy resin composition containing at least the following component (1.) and component (2.):

(1.) an epoxy resin; and
(2.) a clathrate containing the following:
i. the host component (A) being defined by a) formula (I):

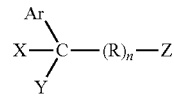
[I]

where n is 0 or 1
Ar is an optionally substituted aryl group
X is independently selected from H, OH, an optionally substituted alkyl group and an optionally substituted aryl group;
Y is independently selected from H, OH, an aryl group, an optionally substituted alkyl group, an optionally substituted aryl group;
R is a divalent optionally substituted hydrocarbyl group and
Z is selected from: 1) C(=O)O—R' wherein R' is selected from hydrogen, an optionally substituted hydrocarbyl group; and 2) a ring structure including Y and C or
b) a phenolphthalin
ii. the guest component (B) comprising a curative.

The average particle size D50 of the clathrate as measured by laser diffraction (ASTM D4464) is, but not particularly limited to, the range of about 0.01 to 100 µm, preferably in the range of about 0.1 to 100 µm, more preferably from 1 to 50 µm and even more preferably from 5 to 40 µm or from 10 to 30 µm and/or combinations of the aforesaid ranges.

Epoxy Resin Component (1.)

The epoxy component may be mono-functional or multifunctional, preferably at least difunctional. In an embodiment, the epoxy resin component (A) may be selected from various conventionally-known polyepoxy compounds. Examples thereof include: aromatic glycidyl ether compounds such as bis(4-hydroxyphenyl)propane diglycidyl ether, bis(4-hydroxy-3,5-dibromophenyl)propane diglycidyl ether, bis(4-hydroxyphenyl)ethane diglycidyl ether, bis(4-hydroxyphenyl)methane diglycidyl ether, resorcinol diglycidyl ether, phloroglucinol triglycidyl ether, trihydroxy biphenyl triglycidyl ether, tetraglycidyl benzophenone, bis-resorcinol tetraglycidyl ether, tetramethyl bisphenol A diglycidyl ether, bisphenol C diglycidyl ether, bisphenol hexafluoropropane diglycidyl ether, 1,3-bis[1-(2,3-epoxypropoxy)-1-trifluoromethyl-2,2,2-trifluoroethyl]benzene, 1,4-bis[1-(2,3-epoxypropoxy)-1-trifluoromethyl-2,2,2-trifluoromethyl]benzene, 4,4'-bis(2,3-epoxypropoxy)octafluorobiphenyl, and phenolic novolac type bisepoxy compounds; alicyclic polyepoxy compounds such as alicyclic diepoxy acetal, alicyclic diepoxy adipate, alicyclic diepoxy carboxylate, and vinylcyclohexene dioxide; glycidyl ester compounds such as diglycidyl phthalate, diglycidyl tetrahydrophthalate, diglycidyl hexahydrophthalate, dimethylglycidyl phthalate, dimethylglycidyl hexahydrophthalate, diglycidyl-p-oxybenzoate, diglycidylcyclopentane-1,3-dicarboxylate, and dimer acid glycidyl ester; glycidyl amine compounds such as diglycidyl aniline, diglycidyl toluidine, triglycidyl aminophenol, tetraglycidyl diaminodiphenyl methane, and diglycidyl tribromoaniline; and heterocyclic epoxy compounds such as diglycidylhydantoin, glycidyl glycidoxyalkylhydantoin, and triglycidyl isocyanurate; and oligomer compounds thereof.

Examples of the liquid epoxy resin include polyalkylene ether type epoxy compounds such as (poly)ethylene glycol diglycidyl ether, (poly)propylene glycol diglycidyl ether, and trimethylolpropane triglycidyl ether; glycidyl ester type epoxy compounds such as dimer acid diglycidyl ester, phthalic acid diglycidyl ester, and tetrahydrophtalic acid diglycidyl ester; and homopolymers of glycidyl (meth) acrylate, allyl glycidyl ether and the like or copolymers of these monomers with other soft unsaturated monomers. In this context, soft unsaturated monomer refers to a monomer which contains a homopolymer which has a glass transition temperature of less than 60° C. Examples of soft unsaturated monomers include methyl acrylate, ethyl acrylate, butyl (meth)acrylate, isobutyl(meth)acrylate, 2-ethylhexyl(meth) acrylate, and lauryl methacrylate.

Clathrate Component (2.)

In the present invention, the term "clathrate" refers to a compound in which two or more molecules are bound via a bond other than a covalent bond, and more preferably, it refers to a crystalline compound in which two or more molecules are bound via their molecular interaction. For Example in a clathrate formed between a host containing a carboxyl or carboxylic acid ester group such as phenolphthalin and a guest component containing nitrogen such as an imidazoline the molecules may be bound by one of the hydrogens on the nitrogen forming a hydrogen bond with the oxygen of the carboxylate functionality.

A compound which includes is referred to as the host compound and the compound which is included in the host compound is referred to as the guest compound. The host compound and the guest compound form the clathrate compound or structure.

Instead of a single guest compound, two or more different guest compounds may be present in the clathrate. The guest compounds are preferably amino based curatives such as imidazole compounds or imidazoline compounds as defined above under formula (II). The guest compounds may also include accelerators or a combination of curatives and accelerators.

Host Compound (A)

The host compound (A) is at least one compound selected from the group consisting of a carboxylic acid compound represented by a phenolphthalin or the formula (I):

i. the host component (A) being defined by the formula (I):

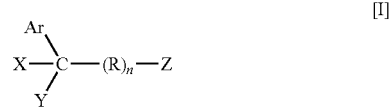

where n is 0 or 1

Ar is an optionally substituted aryl group

X is independently selected from H, OH, an optionally substituted alkyl group and an optionally substituted aryl group;

Y is independently selected from H, OH, an aryl group, an optionally substituted alkyl group, an optionally substituted aryl group;

R is a divalent optionally substituted hydrocarbyl group and

Z is selected from
1) C(=O)O—R' wherein R' is selected from hydrogen, an optionally substituted hydrocarbyl group; and
2) a ring structure formed including Y and C in formula I;

R and R' may be independently a linear or branched substituted or unsubstituted, saturated or unsaturated $C_1$-$C_9$ alkyl or aryl hydrocarbyl group and when it is an alkyl group it may be cyclic or heterocyclic.

The "optional substituent" of R and/or R' may be a halogen atom, a $C_1$-$C_6$ alkyl group, an aryl group, a $C_1$-$C_6$ alkoxy group, a hydroxy group, a carboxy group, a nitro group, an amino group, and an acyl group.

In preferred embodiments the carboxylic acid or carboxylic ester compound may be selected from phenylacetic acid, 4-aminophenylacetic acid (APAA), phenolphthalin ® (PhPh), benzilic acid (BA), 2,2-bis(p-hydroxyphenyl)propionic acid (BHPPA), or 4,4-bis(p-hydroxyphenyl)valeric acid (BHPVA) or 2,2-bis(p-hyroxyphenyl) acetic acid (BHPAA) and their alkyl esters preferably $C_1$ to $C_9$ alkyl ester.

Guest Compound (B)

The guest component (B) preferably comprises an accelerator or curative compound having an amino group. Imidazole-based and/or imidazoline based curative compounds are particularly suitable.

The guest component (B) may be selected from at least one compound selected from the group consisting of a compound represented by formula (II) and/or DBCA.

In the formula (II), $R_1$ represents a hydrogen atom, a $C_1$-$C_{10}$ alkyl group, an aryl group, an arylalkyl group, or a cyanoethyl group, and preferably represents a hydrogen atom.

The $C_1$-$C_{10}$ alkyl group is preferably a $C_1$-$C_6$ alkyl group, and optionally has a substituent. Specific examples of the $C_1$-$C_{10}$ alkyl group can include a methyl group, an ethyl group, a n-propyl group, an i-propyl group, a n-butyl group, a s-butyl group, an i-butyl group, a t-butyl group, a n-pentyl group, a n-hexyl group, a nonyl group, an i-nonyl group, and a decyl group.

The aryl group means a monocyclic or polycyclic aryl group. Here, in the case of a polycyclic aryl group, the aryl group also encompasses a partially saturated group in addition to a fully unsaturated group. Examples thereof include a phenyl group, a naphthyl group, an azulenyl group, an indenyl group, an indanyl group, and a tetralinyl group. Among these groups, a $C_6$-$C_{10}$ aryl group is preferred. Further, the aryl group optionally has a substituent.

The arylalkyl group is a group in which the aryl group and the alkyl group are combined with each other. Examples thereof include a benzyl group, a phenethyl group, a 3-phenyl-n-propyl group, a 1-phenyl-n-hexyl group, a naphthalen-1-ylmethyl group, a naphthalen-2-ylethyl group, a 1-naphthalen-2-yl-n-propyl group, and an inden-1-ylmethyl group. Among these groups, a $C_6$-$C_{10}$ aryl/$C_1$-$C_6$ alkyl group are preferred. Further, the arylalkyl group optionally has a substituent.

$R_2$ to $R_4$ each independently represent a hydrogen atom, a nitro group, a halogen atom, a $C_1$-$C_{20}$ alkyl group, a $C_1$-$C_{20}$ alkyl group substituted with a hydroxy group, an aryl group, an arylalkyl group, or a $C_1$-$C_{20}$ acyl group.

Examples of the $C_1$-$C_{20}$ alkyl group include a methyl group, an ethyl group, a n-propyl group, an i-propyl group, a n-butyl group, a s-butyl group, an i-butyl group, a t-butyl group, a n-pentyl group, a n-hexyl group, a nonyl group, an i-nonyl group, a decyl group, a lauryl group, a tridecyl group, a myristyl group, a pentadecyl group, a palmityl group, a heptadecyl group, and a stearyl group. A $C_1$-$C_{10}$ alkyl group is preferred.

The aryl group and the arylalkyl group include the same groups as the groups for $R_1$.

The $C_1$-$C_{20}$ acyl group means a group in which a hydrogen atom, an alkyl group, an alkenyl group, an alkynyl group, an aryl group, a heteroaryl group, or the like is combined with a carbonyl group. Examples of the acyl group include a formyl group; alkylcarbonyl groups such as an acetyl group, a propionyl group, a butyroyl group, a pentanoyl group, a hexanoyl group, a heptanoyl group, an octanoyl group, a nonanoyl group, a decanoyl group, a 3-methylnonanoyl group, an 8-methylnonanoyl group, a 3-ethyloctanoyl group, a 3,7-dimethyloctanoyl group, an undecanoyl group, a dodecanoyl group, a tridecanoyl group, a tetradecanoyl group, a pentadecanoyl group, a hexadecanoyl group, a 1-methylpentadecanoyl group, a 14-methylpentadecanoyl group, a 13,13-dimethyltetradecanoyl group, a heptadecanoyl group, a 15-methylhexadecanoyl group, an octadecanoyl group, a 1-methylheptadecanoyl group, a nonadecanoyl group, an eicosanoyl group, and a heneicosanoyl group; alkenylcarbonyl groups such as an acryloyl group, a methacryloyl group, an allylcarbonyl group, and a cinnamoyl group; alkynylcarbonyl groups such as an ethynylcarbonyl group and a propynylcarbonyl group; arylcarbonyl groups such as a benzoyl group, a naphthylcarbonyl group, a biphenylcarbonyl group, and an anthranilcarbonyl group; and heteroarylcarbonyl groups such as a 2-pyridylcarbonyl group and a thienylcarbonyl group. Among these groups, a $C_1$-$C_{20}$ (including a carbonyl group) acyl group is preferred, and a $C_1$-$C_6$ acyl group is particularly preferred.

Specific examples of the imidazole compound represented by formula (II) include imidazole, 2-ethyl-4-methylimidazole, 1-methylimidazole, 2-methylimidazole, 4-methylimidazole, 1-benzyl-2-methylimidazole, 2-heptadecylimidazole, 2-undecylimidazole, 2-phenyl-4-methyl-5-hydroxymethylimidazole, 2-phenylimidazole, 2-phenyl-4-methylimidazole, 1-benzyl-2-phenylimidazole, 1,2-dimethylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, and 2-phenyl-4,5-dihydroxymethylimidazole, and imidazole, 2-ethyl-4-methylimidazole, 1-methylimidazole, 2-methylimidazole, 4-methylimidazole, 1-benzyl-2-methylimidazole, 2-heptadecylimidazole, 2-undecylimidazole, 1,2-dimethylimidazole, 2-phenyl-4-methyl-5-hydroxymethylimidazole, 2-phenylimidazole, or 2-phenyl-4,5-dihydroxymethylimidazole is preferred.

Examples of the imidazoline compound represented by formula (II) include 2-methylimidazoline, 2-phenylimidazoline, 2-undecylimidazoline, 2-heptadecylimidazoline, 2-ethylimidazoline, 2-isopropylimidazoline, 2,4-dimethylimidazoline, and 2-phenyl-4-methylimidazoline, and 2-methylimidazoline or 2-phenylimidazoline is preferred.

With respect to the clathrate of the compound of (i) with the imidazole compound or imidazoline compound and/or DBCA of (ii), the combination thereof is not particularly limited as long as these compounds are within the range as described above.

Method for Producing Clathrate

With respect to the method for producing the clathrate, the clathrate can be obtained by directly mixing the compound of (A) with the imidazole compound or imidazoline compound and/or DBCA (B) with all components in their liquid (molten) phase, or by mixing these compounds in a solvent.

When a solvent is used, the clathrate can be obtained by adding the host compound and the guest compound to a solvent, followed by subjecting the resulting mixture to heat treatment or heating and reflux treatment with optional stirring to precipitate the clathrate. It is preferred to use organic solvents such as methanol, acetone, and ethyl acetate as a solvent.

When the imidazole compound or imidazoline compound and/or DBCA of (B) is a substance having a low boiling point or a substance having high vapour pressure, a target clathrate can be obtained by applying the vapour of these substances to the compound of (A).

A clathrate consisting of three components or more can also be obtained by allowing two or more types of compounds of (B) to react with the compound of (A). Furthermore, a target clathrate can be obtained by first producing a clathrate of a compound of (A) with a certain compound (ii) and then allowing the resulting clathrate to react with a different compound of (ii) in the manner as described above.

The structure of the clathrate obtained can be verified by thermal analysis (TGA-DSC, Simultaneous Thermogravimetry & Differential Scanning calorimetry), an infrared absorption spectrum (IR), an X-ray diffraction pattern, a NMR spectrum, or the like, X-ray diffraction being particularly useful. Further, the composition of the clathrate can be verified by thermal analysis, a $^1$H-NMR spectrum, high performance liquid chromatography (HPLC), elementary analysis, or the like.

Organic Solvent

Organic solvents may be used in the forming of the clathrates. Suitable organic solvents include alcohols such as methanol, ethanol, propanol, and butanol; ethers such as 2-methoxyethanol, ethylene glycol monoethyl ether, ethylene glycol monobutyl ether, diethylene glycol, diethylene glycol monoethyl ether, and diethylene glycol monobutyl ether; ketones such as acetone, methyl ethyl ketone, 2-pentanone, 2-hexanone, methyl isobutyl ketone, isophorone, and cyclohexanone; esters such as methyl acetate, ethyl acetate, propyl acetate, butyl acetate, isobutyl acetate, ethylene glycol monoethyl ether acetate, propylene glycol monomethyl ether acetate, and diethylene glycol monoethyl ether acetate; and aromatics such as toluene and xylene; and any mixture of two or more of the aforesaid solvents.

Curing Agent or Curing Accelerator

When the component (B) is a curing agent, a curing accelerator may be further included, and when the component (B) is a curing accelerator, a curing agent may be further included.

A curing agent which may be contained in addition to the curing agent accelerator is not particularly limited as long as it is a compound which reacts with an epoxy group in an epoxy resin to cure the epoxy resin. Similarly, a curing accelerator which may be contained in addition to the curing agent is not particularly limited as long as it is a compound which accelerates the above curing reaction. Any one of conventional curing agents or curing accelerators of epoxy resins can be selected and used as such a curing agent or a curing accelerator, respectively. Examples thereof include amine-based compounds such as aliphatic amines, alicyclic and heterocyclic amines, aromatic amines, and modified amines, imidazole-based compounds, imidazoline-based compounds, amide-based compounds, ester-based compounds, phenol-based compounds, alcohol-based compounds, thiol-based compounds, ether-based compounds, thioether-based compounds, urea-based compounds, thiourea-based compounds, Lewis acid-based compounds, phosphorus-based compounds, acid anhydride-based compounds, onium salt-based compounds, and active silica compound-aluminium complexes.

Specific examples of the curing agent or the curing accelerator include the following compounds.

Examples of the aliphatic amines include ethylenediamine, trimethylenediamine, triethylenediamine, tetramethylenediamine, hexamethylenediamine, diethylenetriamine, triethylenetetramine, tetraethylenepentamine, dipropylenediamine, dimethylaminopropylamine, diethylaminopropylamine, trimethylhexamethylenediamine, pentanediamine, bis(2-dimethylaminoethyl)ether, pentamethyldiethylenetriamine, alkyl-t-monoamine, 1,4-diazabicyclo(2,2,2)octane(triethylenediamine), N,N,N',N'-tetramethylhexamethylenediamine, N,N,N',N'-tetramethylpropylenediamine, N,N,N',N'-tetramethylethylenediamine, N,N-dimethylcyclohexylamine, dibutylaminopropylamine, dimethylaminoethoxyethoxyethanol, triethanolamine, and dimethylaminohexanol.

Examples of the alicyclic and heterocyclic amines include piperidine, piperazine, menthanediamine, isophoronediamine, methylmorpholine, ethylmorpholine, N,N',N''-tris(dimethylaminopropyl)hexahydro-s-triazine, 3,9-bis(3-aminopropyl)-2,4,8,1 0-tetraoxyspiro(5,5)undecane adduct, N-aminoethylpiperazine, trimethylaminoethylpiperazine, bis(4-aminocyclohexyl)methane, N,N'-dimethylpiperazine, and 1,8-diazabicyclo[4.5.0]undecec-7ene and 1,5 diazabicyclo(4.3.0) non-5-ene.

Examples of the aromatic amines include o-phenylenediamine, m-phenylenediamine, p-phenylenediamine, diaminodiphenylmethane, diaminodiphenyl sulfone, benzylmethylamine, dimethylbenzylamine, m-xylenediamine, pyridine, picoline, and a-methylbenzylmethylamine.

Examples of the modified amines include epoxy compound-added polyamine, Michael-added polyamine, Mannich-added polyamine, thiourea-added polyamine, ketone-blocked polyamine, dicyandiamide, guanidine, organic acid hydrazide, diaminomaleonitrile, amine imide, a boron trifluoride-piperidine complex, and a boron trifluoride-monoethylamine complex.

Examples of the imidazole-based compounds include imidazole, 1-methylimidazole, 2-methylimidazole, 3-methylimidazole, 4-methylimidazole, 5-methylimidazole, 1-ethylimidazole, 2-ethylimidazole, 3-ethylimidazole, 4-ethylimidazole, 5-ethylimidazole, 1-n-propylimidazole, 2-n-propylimidazole, 1-isopropylimidazole, 2-isopropylimidazole, 1-n-butylimidazole, 2-n-butylimidazole, 1-isobutylimidazole, 2-isobutylimidazole, 2-undecyl-1 H-imidazole, 2-heptadecyl-1H-imidazole, 1,2-dimethylimidazole, 1,3-dimethylimidazole, 2,4-dimethylimidazole, 2-ethyl-4-methylimidazole, 1-phenylimidazole, 2-phenyl-1 H-imidazole, 4-methyl-2-phenyl-1 H-imidazole, 2-phenyl-4-methylimidazole, 1-benzyl-2-methylimidazole, 1-benzyl-2-phenylim idazole, 1 -cyanoethyl-2-methylim idazole, 1 -cyanoethyl-2-ethyl-4-methylimidazole, 1-cyanoethyl-2-undecylimidazole, 1-cyanoethyl-2-phenylimidazole, 2-phenylimidazole-isocyanuric acid adduct, 2-methylimidazole-isocyanuric acid adduct, 2-phenyl-4,5-dihydroxymethylimidazole, 2-phenyl-4-methyl-5-hydroxymethylimidazole, 1-cyanoethyl-2-phenyl-4,5-d i(2-cyanoethoxy)methylimidazole, 1 -dodecyl-2-methyl-3-benzylimidazolium chloride, and 1-benzyl-2-phenylimidazole hydrochloride.

Examples of the imidazoline-based compounds include 2-methylimidazoline and 2-phenylimidazoline.

Examples of the amide-based compounds include a polyamide obtained by condensation of a dimer acid with a polyamine.

Examples of the ester-based compounds include active carbonyl compounds such as an aryl ester and a thioaryl ester of a carboxylic acid.

Examples of the phenol-based compounds, alcohol-based compounds, thiol-based compounds, ether-based compounds, and thioether-based compounds include, as a phenolic resin curing agent, aralkyl type phenolic resins such as a phenol aralkyl resin and a naphthol aralkyl resin, novolac type phenolic resins such as a phenolic novolac resin and a cresol novolac resin, modified resin thereof such as epoxidized or butylated novolac type phenolic resins, dicyclopentadiene-modified phenolic resins, paraxylene-modified phenolic resins, triphenol alkane type phenolic resins, and polyfunctional phenolic resins. Further examples include polyols, polymercaptans, polysulfides, 2-(dimethylaminomethylphenol), 2,4,6-tris(dimethylaminomethyl)phenol, and tri-2-ethylhexyl hydrochloride of 2,4,6-tris(dimethylaminomethyl)phenol.

Examples of the urea-based compounds, thiourea-based compounds, Lewis acid-based compounds include a butylated urea, a butylated melamine, a butylated thiourea, and boron trifluoride.

Examples of the phosphorus-based compounds include organic phosphine compounds, including primary phosphines such as alkylphosphines such as ethylphosphine and butyl phosphine, and phenylphosphine; secondary phosphines such as dialkyl phosphines such as dimethylphosphine and dipropylphosphine, diphenylphosphine, and methylethylphosphine; and tertiary phosphines such as trimethylphosphine, triethylphosphine, and triphenylphosphine.

Examples of the acid anhydride compounds include phthalic anhydride, tetrahydrophthalic anhydride, hexahydrophthalic anhydride, methyltetrahydrophthalic anhydride, methylhexahydrophthalic anhydride, endomethylenetetrahydrophthalic anhydride, methylendomethylenetetrahydrophthalic anhydride, maleic anhydride, tetramethylenemaleic anhydride, trimellitic anhydride, chlorendic anhydride, pyromellitic anhydride, dodecenylsuccinic anhydride, benzophenone tetracarboxylic acid anhydride, ethyleneglycol bis(anhydrotrimellitate), glycerol tris(anhydrotrimellitate), methylcyclohexene tetracarboxylic acid anhydride, and polyazelaic acid anhydride.

Examples of the onium salt-based compounds and active silica compound-aluminum complexes include aryldiazonium salt, diaryliodonium salt, triarylsulfonium salt, a triphenylsilanol-aluminum complex, a triphenylmethoxysilane-aluminum complex, a silyl peroxide-aluminum complex, and a triphenylsilanol-tris(salicylaldehydato)aluminum complex.

Particularly, amine-based compounds, imidazole-based compounds, and phenol-based compounds are preferably used as the curing agent or the curing accelerator. Among the phenol-based compounds, a phenolic resin curing agent is more preferably used.

Prepreg Matrix Formulation

In a further embodiment a moulding material is provided comprising a reinforcement material and resin formulation containing a clathrate composition according to this invention.

The moulding material may be constructed from a cast resin film which contains the resin formulation and which is combined with a fibrous reinforcement layer. Preferably the resin film impregnates the fibrous reinforcement which may be accomplished by pressing a layer of resin onto the fibrous material or by infusion of the resin into fibrous material within a mould.

A liquid curable epoxy resin composition of the present invention is particularly useful as a prepreg matrix resin formulation comprising epoxy resin component (1.) and clathrate component (2.).

The prepreg resin formulation of the present invention is excellent in both storage stability and curing characteristics although it is a one-component liquid epoxy resin composition. A prepreg resin formulation which is significantly excellent in storage stability and curing characteristics and provides a cured product significantly excellent in characteristics, particularly organic solvent resistance, can be obtained by using, a clathrate which is the component (2.) of the prepreg resin formulation of the present invention.

In the prepreg resin formulation of the present invention, the clathrate component (2.) can be used as a curing agent or as a curing accelerator. The component (2.) contains a host (A) and a guest component (B).

The guest component (B) which may operate as a curing agent or as a curing accelerator. The component (B) is quickly released by heating from a host component (A), and if the component (B) is a curing agent, it will undergo a crosslinking reaction with the resin component (1.). If the component (B) is an accelerator, the released curing accelerator acts as a curing catalyst of the curing agent and the resin component (1.), thereby forming a cured formulated resin matrix. Since the temperature at which the curing agent or the curing accelerator is released is different depending on:
the type of the guest component (chemical structure);
the type of host component (chemical structure); and
the blending ratio of the guest to the host,
solubility in the epoxy resin the conditions for the release of the host component can be controlled by selecting appropriate host and guest components.

In the resin formulations of the present invention, the host compound can react with the resin after releasing the guest compound, thereby having an effect as a crosslinking agent. This is particularly so when the host compound is a carboxylic acid and can result in the cured resin formulation product having improved flexibility and improved impact resistance and adhesion. This is an important advantage over known clathrates which may be used as curatives or accelerators in epoxy resin formulations.

When the epoxy resin composition of the present invention is used as a prepreg resin formulation, known additives such as fillers, viscosity modifiers, tougheners, pigments, thixotropic agents, and fire retardants, or the like can be optionally mixed into the formulation to enhance its mechanical performance and flow behaviour during cure.

A prepreg resin formulation of the present invention can be prepared by uniformly mixing the clathrate of the invention, the resin and other additives using a pot mill, a ball mill, a bead mill, a roll mill, a homogenizer, Supermill, Homodisper, a universal mixer, Banbury mixer, a kneader, or the like.

Since the prepreg resin formulation of the present invention can be a one-component type and has both high storage stability and excellent thermosetting properties, it can be suitably used for applications which require long term storage or storage in unconditioned facilities at room temperature.

We will now disclose a number of preferred clathrate components (2.) which can be used in combination with a suitable resin component (1.).

We have found that clathrates with dicarboxylic acid hosts in which the carboxyl groups are linked totally directly to an aromatic nucleus tend to have good outlife but lack the required reactivity for snap cure. On the other hand, clathrates with tri and di functional phenolic hosts tend to have the desired reactivity for snap cure but tend to have poor outlife.

In a preferred embodiment, the host component (A) contains both phenolic and carboxylic acid or ester functionalities both of which are capable of forming clathrates with imidazoles. For example a preferred host component is 4,4'-bis(4'-hydroxyphenyl)valeric acid (BHPVA) which contain both phenol and carboxylic acid functionalities. Preferably the clathrate is formed with 2-ethyl-4-methylimidazole (2E4MZ). The structures are shown below.

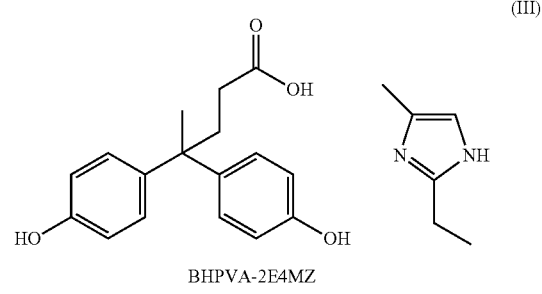

BHPVA-2E4MZ

This clathrate of BHPVA with 2E4MZ can be prepared by stirring in BHPVA in a refluxing organic solvent and adding in the imidazole guest component (B) in the same solvent. The precipitate of this mixture is the clathrate of BHPVA-2E4MZ.

Other monocarboxylic clathrate compositions according to the invention are now described.

Another preferred host component (A) may be phenolphthalin (PhPh) which contains bis-phenol and mono-carboxylic acid functionalities, both of which are capable of forming clathrates with imidazoles. Preferably the clathrate is formed with 2-ethyl-4-methylimidazole (2E4MZ), 2-methylimidazole (2MZ) or imidazole (IMZ). The structure with 2E4MZ is shown below.

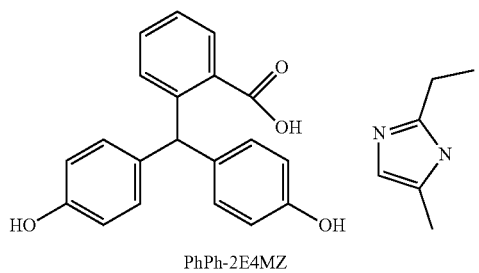

(IV)

PhPh-2E4MZ

In another clathrate, the host component (A) may be benzilic acid (BA) which contains phenyl and mono-carboxylic acid functionalities, which is capable of forming clathrates with imidazoles. Again, preferably the clathrate is formed with 2-ethyl-4-methylimidazole (2E4MZ). The structures are shown below.

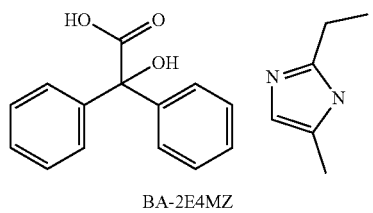

(V)

BA-2E4MZ

In another clathrate, the host component (A) may be 4-aminophenylacetic acid (APAA) containing aminophenyl and mono-carboxylic acid functionalities, both of which are capable of forming clathrates with imidazoles. Again, preferably the clathrate is formed with 2-ethyl-4-methylimidazole (2E4MZ). The structures are shown below.

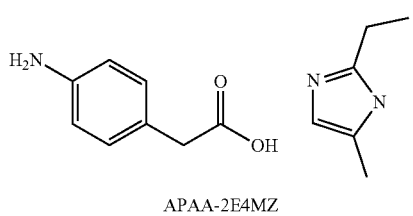

(VI)

APAA-2E4MZ

The esters of these carboxylic acid based clathrates are also embodiments of the invention.

EXAMPLES

Embodiments of the invention will now be described by way of example only and with reference to the below Examples.

The following constituent components were used in the preparation of the compositions of the Examples.

| Component | Description |
|---|---|
| Host | |
| BHPVA | 4,4'-bis(4'-hydroxyphenyl)valeric acid |
| PhPh | phenolphthalin |
| BHPPA | 2,2-bis(p-hydroxyphenyl)propionic acid |
| BA | benzilic acid |
| APAA | 4-aminophenylacetic acid |
| BHPAA | 2,2-bis(p-hydroxyphenyl)acetic acid |
| | Comparative Host |
| PDCA | 2,6-pyridine dicarboxylic acid |
| SA | succinic acid |
| | Guest |
| C11Z | 2-undecylimidazole |
| IMZ | imidazole |
| 2MZ | 2-methylimidazole |
| 2E4MZ | 2-ethyl-4-methylimidazole |
| 2PZL | 2-phenylimidazoline |
| DBU | 1,8-diazabicyclo(5.4.0)undec-7-ene |
| IPDA | isophorone diamine |
| MXDA | meta-xylylenediamine |
| BDMA | N1N-dimethylbenzylamine |
| DMP30 | (2,4,6-trisdimethylaminomethyl)phenol |
| | Resin |
| LY1556 | bisphenol A epoxy resin (Huntsman) |
| Epikote 828 | bisphenol A epoxy resin (Hexion) |

The following methods were used to measure various parameters of the cured resin:

Dynamic differential scanning calorimetry (DSC) was performed using a TA Q100 instrument to determine uncured glass transition temperature (Tg) in accordance with ASTM D7028, cure onset temperatures $T_c$, and reactivity and residual cure using a heating rate of 10° C./min, from −50 to 350° C.

Isothermal differential scanning calorimetry (DSC) was performed using a DSC 1 from Mettler Toledo instrument to determine time to 95% cure at various temperatures and cure schedules.

Dynamic mechanical analysis (DMA) was performed using a Q800 instrument on cured resin to determine glass transition temperatures Tg at a heating rate of 5° C./min and at a frequency of 1 Hz, and at an amplitude of 30 µm. E' Tg was determined in accordance with ASTM D7028-07 (2015).

All clathrates obtained according to the processes described in the examples were verified as clathrates by means of measuring IR spectra, NMR spectra, and thermal analysis (TGA-DSC).

Comparative Example 1—PDCA-IMZ 10.0 g of 2,6-pyridine dicarboxylic acid was stirred in 200 ml of refluxing ethyl acetate. 4.1 g of imidazole was added to the solution portion-wise. The mixture was refluxed for 3 hours before allowing to cool to room temperature. The resulting precipitate was collected by filtration and dried in a vacuum oven at room temperature overnight to give 13.8 g of a white powder. The ratio of host to guest in the precipitated clathrate was shown to be approximately 1:1 by 1H NMR which is equal to 28.9 wt. % of imidazole.

Comparative Example 2—PDCA-C11Z 10.0 g of 2,6-pyridine dicarboxylic acid and 13.3 g of 2-undecylimidazole were stirred in 200 ml of refluxing ethyl acetate. The mixture was refluxed for 3 hours before allowing to cool to room temperature. The resulting precipitate was collected by filtration and dried in a vacuum oven at room temperature overnight to give 22.6 of a white powder. The ratio of host to guest in the precipitated clathrate was shown to be approximately 1:1 by 1H NMR which is equal to 57.1 wt. % of imidazole.

Comparative Example 3—SA-2E4MZ 10.0 g of succinic acid was stirred in 70 ml of refluxing methanol. A solution of 9.5 g of 2-ethyl-4-methylimidazole in 15 ml of acetone was added to the solution drop-wise. The mixture was refluxed for 3 hours before allowing to cool to room temperature. The resulting precipitate was collected by filtration and dried in a vacuum oven at room temperature overnight to give 16.5 g of a white powder. The ratio of host to guest in the precipitated clathrate was shown to be approximately 1:1 by 1H NMR which is equal to 48.3 wt. % of imidazole.

Example 1—BHPVA-2E4MZ 10.0 g of 4,4'-bis(4'-hydroxyphenyl)valeric acid was stirred in 150 ml of refluxing acetone. A solution of 3.85 g of 2-ethyl-4-methylimidazole in 15 ml of acetone was added to the solution drop-wise. The mixture was refluxed for 3 hours before allowing to cool to room temperature. The resulting precipitate was collected by filtration and dried in a vacuum oven at room temperature overnight to give 12.3 g of a white powder. The ratio of host to guest in the precipitated clathrate was shown to be approximately 1:1 by 1H NMR which is equal to 27.8 wt. % of imidazole.

Example 2—BHPVA-2MZ

BHPVA-2MZ was prepared using the procedure in example 1 with 10.0 g of 4,4'-bis(4'-hydroxyphenyl)valeric acid and 2.9 g of 2-methylimdazole to give 12.9 g of a white powder. The ratio of host to guest in the precipitated clathrate was shown to be approximately 1:1 by 1H NMR which is equal to 22.3 wt. % of imidazole.

Example 3—PhPh-2E4MZ

PhPh-2E4MZ was prepared using the procedure in example 1 with 10.0 g of phenolphthalin and 3.4 g of 2-ethyl-4-methylimidazole to give 12.2 g of a white powder. The ratio of host to guest in the precipitated clathrate was shown to be approximately 1:1 by 1H NMR which is equal to 25.6 wt. % of imidazole.

Example 4—PhPh-2MZ

PhPh-2MZ was prepared using the procedure in example 1 with 10.0 g of phenolphthalin and 2.9 g of 2-methylimdazole to give 12.3 g of a white powder. The ratio of host to guest in the precipitated clathrate was shown to be approximately 1:1 by 1H NMR which is equal to 22.3 wt. % of imidazole.

X-ray crystallographic studies showed the material to be a salt type clathrate containing hydrogen bonds between phenolic groups, carboxylic groups and the nitrogen atoms of the imidazole.

Example 5—PhPh-IMZ

PhPh-IMZ was prepared using the procedure in example 1 with 10.0 g of phenolphthalin and 2.2 g of imidazole to give 11.5 g of a white powder. The ratio of host to guest in the precipitated clathrate was shown to be approximately 1:1 by 1H NMR which is equal to 17.5 wt. % of imidazole.

X-ray crystallographic studies showed the material to be a salt type clathrate containing hydrogen bonds between phenolic groups, carboxylic groups and the nitrogen atoms of the imidazole.

Example 6 BHPPA-2E4MZ

BHPPA-2E4MZ was prepared using the procedure in example 1 with 16.0 g of 2,2'-bis(4'-hydroxyphenyl)propionic acid and 6.8 g of 2-ethyl-4-methylimdazole to give 15.1 g of an off white powder. The ratio of host to guest in the precipitated clathrate was shown to be approximately 1:1 by 1H NMR which is equal to 22.3 wt. % of imidazole.

Example 7—BA-2E4MZ

BA-2E4MZ was prepared using the procedure in example 1 with 10.0 g of benzilic acid and 4.8 g of 2-ethyl-4-methylimidazole to give 13.3 g of a white powder. The ratio of host to guest in the precipitated clathrate was shown to be approximately 1:1 by 1H NMR which is equal to 32.6 wt. % of imidazole.

Example 8—BHPAA-2E4MZ

BHPAA-2E4MZ was prepared using the procedure in example 1 with 6.5 g of 2,2'-bis(P-hydroxyphenyl)acetic acid and 2.7 g of 2-ethyl-4-methylimdazole to give 8.3 g of a cream powder. The ratio of host to guest in the precipitated clathrate was shown to be approximately 1:1 by 1H NMR which is equal to 31.1 wt. % of imidazole.

Example 9—BHPAA-2MZ

BHPAA-2MZ was prepared using the procedure in example 1 with 10.0 g of 2,2'-bis(P-hydroxyphenyl)acetic acid and 3.0 g of 2-methylimdazole to give 9.9 g of an off white powder. The ratio of host to guest in the precipitated clathrate was shown to be approximately 1:1 by 1H NMR which is equal to 25.1 wt. % of imidazole.

Example 10—APAA-2E4MZ 10 g of 4-aminophenylacetic acid was stirred in 60 ml of refluxing acetone. To the solution/suspension was added 7.3 g of 2-ethyl-4-methylimidazole drop-wise as a solution in 15 ml of acetone. The mixtures were refluxed for 3 hours before cooling to room temperature. The precipitate was removed by filtration. The solvents from the filtrate were removed by rotary evaporation to yield a liquid. Ethyl acetate was added and the product left to crystallise overnight. The crystals were collected by filtration and then dried in a vacuum oven at room temperature overnight to give 12.8 g of a pale orange powder. The ratio of host to guest in the precipitated clathrate was shown to be approximately 1:1 by 1H NMR which is equal to 42.1 wt. % of imidazole.

Example 11—PhPh-2MZ-IMZ

PhPh-2MZ-IMZ was prepared using the procedure in example 1 with 10.0 g of 4 phenolphthalin 1.3 g of 2-methylimidazole and 1.1 g of imidazole to give 12.1 g of a white powder. The ratio of host to guest in the precipitated clathrate was shown to be approximately 1:1 by 1H NMR. The ratio of 2MZ to IMZ in the clathrate was shown to be 0.58 to 0.42 which is equal to 18.7 wt. % of imidazole.

Example 12—BHPVA-2PZL

BHPVA-2PZL was prepared using the procedure in example 1 with 10.0 g of 4,4'-bis(4'-hydroxyphenyl)valeric acid and 5.1 g of 2-phenylimidazoline to give 14.7 g of a cream powder. The ratio of host to guest in the precipitated clathrate was shown to be approximately 1:1 by 1H NMR which is equal to 33.8 wt. % of imidazoline.

Example 13—PhPh-2PZL

PhPh-2PZL was prepared using the procedure in example 1 with 10.0 g of phenolphthalin and 5.3 g of 2-phenylimidazoline to give 14.3 g of a white powder. The ratio of host to guest in the precipitated clathrate was shown to be approximately 1:1 by 1H NMR which is equal to 31.3 wt. % of imidazoline.

Example 14—BHPVA-DBU 10 g of the 4,4'-bis(4'-hydroxyphenyl)valeric acid was stirred in 60 ml of refluxing acetone. To the solution/suspension was added 5.3 g of 1,8-diazabicyclo(5.4.0)undec-7-ene either drop-wise as a neat liquid. A small amount of IMS was added until all the oily solid had dissolved. 150-200 ml of additional acetone was then added causing a precipitate to form. The mixtures were refluxed for 3 hours before cooling to room temperature. The precipitate was collected by filtration and then dried in a vacuum oven at 60° C. to give 14.2 g of white powder. The ratio of host to guest in the precipitated clathrate was shown to be approximately 1:1 by 1H NMR which is equal to 34.7 wt. % of DBU.

Example 15—PhPh-DBU

PhPh-DBU was prepared using the procedure in example 1 with 10.0 g of phenolphthalin and 5.3 g of 1,8-diazabicyclo(5.4.0)undec-7-ene to give 13.7 g of a white powder. The ratio of host to guest in the precipitated clathrate was shown to be approximately 1:1 by 1H NMR which is equal to 32.2 wt. % of imidazoline.

Example 16—BHPVA-IPDA

BHPVA-IPDA was prepared using the procedure in example 1 with 10.0 g of 4,4'-bis(4'-hydroxyphenyl)valeric acid and 6.0 g of isophorone diamine to give 11.5 g of a yellow powder. The ratio of host to guest in the precipitated clathrate was shown to be approximately 1:1 by 1H NMR which is equal to 37.3 wt. % of the amine.

Example 17—PhPh-IPDA

PhPh-IPDA was prepared using the procedure in example 1 with 10.0 g of phenolphthalin and 5.3 g of isophorone diamine to give 5.0 g of a cream powder. The ratio of host to guest in the precipitated clathrate was shown to be approximately 1:0.7 by 1H NMR which is equal to 27.1 wt. % of the amine.

Example 18—PhPh-MXDA

PhPh-MXDA was prepared using the procedure in example 1 with 10.0 g of phenolphthalin and 4.3 g of meta-xylylenediamine to give 8.4 g of a yellow powder. The ratio of host to guest in the precipitated clathrate was shown to be approximately 1:0.7 by 1H NMR which is equal to 22.9 wt. % of the amine.

Example 19—BHPVA-BDMA

BHPVA-BDMA was prepared using the procedure in Example 1 with 10.0 g of 4,4'-bis(4'-hydroxyphenyl)valeric acid replacing the 3.85 g of 2ethyl-4-methylinodazole with 4.7 g of N,N-dimethylbenzylamine to give 12.9 g of a white powder. The ratio of host to guest in the precipitated clathrate was shown to be approximately 1:1 by $^1$H NMR which is equal to 32.1 wt. % of the amine.

Example 20—PhPh-BDMA

PhPh-BDMA was prepared using the procedure in Example 3 with 10.0 g of phenolphthalin and 4.2 g of N,N-dimethylbenzylamine to give 13.6 g of a white powder. The ratio of host to guest in the precipitated clathrate was shown to be approximately 1:1 by $^1$H NMR which is equal to 29.7 wt. % of the amine.

Example 21—BHPVA-DMP30

10.0 g of 4,4'-bis(4'-hydroxyphenyl)valeric acid was dissolved in 150 ml of ethyl acetate. A solution of 3.0 g of (2,4,6-trisdimethylaminomethyl)phenol in 50 ml of ethyl acetate was added to the solution drop-wise. The mixture was stirred at room temperature for 2 hours. The resulting precipitate was collected by filtration, washed with ethyl acetate and dried in a vacuum oven at room temperature overnight to give 12.0 g of a white powder. The ratio of host to guest in the precipitated clathrate was shown to be approximately 3:1 by $^1$H NMR which is equal to 23.6 wt. % of the amine.

Example 22—PhPh-DMP30

PhPh-DMP30 was prepared using the procedure in Example 21 with 10.0 g of phenolphthalin and 2.7 g of (2,4,6-trisdimethylaminomethyl)phenol to give 9.5 g of a pale yellow powder. The ratio of host to guest in the precipitated clathrate was shown to be approximately 3:1 by $^1$H NMR which is equal to 21.6 wt. % of the amine.

Various resin compositions were prepared by dispersing the clathrates of the Examples into LY1556/Epikote 828 at room temperature (21° C.) before speedmixing so that the content of the curative in the mixture was 5% by weight based on the weight of the overall mixture. Milling of clathrates was performed using an IKA tube mill for 30 seconds at 5000 rpm followed by 30 seconds at 15000 rpm and finally 30 seconds at 25000 rpm. The mixtures were then evaluated by DSC. The mixture was cured in an oven at 120° C. for 1 hour with a 1° C./min ramp rate. The Tg of the cured resin formulation was determined by DMA in accordance with ASTM D7028-07 (2015).

The cure performance and neat resin properties of the compositions are shown below in Table 1.

TABLE 1

| Compound | Cure onset temperature (° C.) | Peak cure temperature (° C.) | Enthalpy (J/g) | E' Tg (° C.) |
|---|---|---|---|---|
| BHPVA-2E4MZ | 138 | 144 | 380 | 110 |
| BHPVA-2MZ | 122 | 133 | 336 | 124 |
| PhPh-2E4MZ | 142 | 148 | 368 | 128 |
| PhPh-2MZ | 150 | 155 | 325 | 132 |
| PhPh-IMZ | 127 | 139 | 303 | 136 |
| BHPPA-2E4MZ | 137 | 131 | 360 | 133 |
| BA-2E4MZ | 115 | 144 | 370 | 129 |
| APAA-2E4MZ | 124 | 132 | 402 | 133 |
| PhPh-2MZ-IMZ | 139 | 147 | 349 | 132 |
| BHPAA-2E4MZ | 143 | 149 | 367 | 121 |
| BHPAA-2MZ | 136 | 145 | 376 | 126 |
| BHPVA-2PZL | 134 | 142 | 125 | n/a |
| PhPh-2PZL | 154 | 159 | 85 | n/a |
| BHPVA-DBU | 130 | 139 | 168 | n/a |
| PhPh-DBU | 144 | 154 | 191 | n/a |
| BHPVA-BDMA | 119 | 130 | 371 | n/a |
| PhPh-BDMA | 131 | 138 | 3409 | n/a |
| BHPVA-DMP30 | 133 | 156 | 225 | n/a |
| PhPh-DMP30 | 128 | 135 | 265 | n/a |

Dynamic DSC of the BHPVA-2E4MZ clathrate shows similar reactivity to that of the dicarboxylic acid clathrates. However, Isothermal DSC shows BHPVA-2E4MZ to have a shorter time to 95% cure at 120° C. and 150° C., as shown in Table 2.

TABLE 2

| Compound | T to 95% at 120° C. (mins) | T to 95% at 150° C. (mins) |
|---|---|---|
| BHPVA-2E4MZ | 7.9 | 1.2 |
| BHPVA-2MZ | 4.7 | 1.2 |
| PhPh-2E4MZ | 9.3 | 1.3 |
| PhPh-2MZ | 16.2 | 2.0 |
| PhPh-IMZ | 5.8 | 0.6 |
| BHPPA-2E4MZ | 5.7 | 0.7 |
| BA-2E4MZ | 6.7 | 2.2 |
| APAA-2E4MZ | 3.6 | 0.5 |
| PhPh-2MZ-IMZ | 11.1 | 1.3 |
| BHPAA-2E4MZ | 10.0 | 1.8 |
| BHPAA-2MZ | 9.9 | 1.9 |
| BHPVA-2PZL | 11.7 | 2.6 |
| PhPh-2PZL | 29.3 | 4.4 |
| BHPVA-DBU | 11.3 | 3.4 |
| PhPh-DBU | 34.1 | 3.4 |
| Comparative Examples | | |
| PDCA-IMZ | 18.6 | 3.9 |
| PDCA-C11Z | 9.7 | 4.4 |
| SA-2E4MZ | 9.8 | 3.5 |

The outlife was tracked by monitoring the uncured Tg of the mixture of the resin and the clathrate-curative and the results are shown in Table 3.

TABLE 3

| | | Outlife at 23° C., Uncured Tg (° C.) | | | | | |
|---|---|---|---|---|---|---|---|
| Compound | Curative weight % | Start | 1 week | 2 weeks | 4 weeks | 6 weeks | 8 weeks |
| BHPVA-2E4MZ | 27.7 | −19.2 | −19.7 | −18.7 | −16.3 | −12.2 | −8.7 |
| PhPh-2E4MZ | 25.6 | −17.7 | −18.1 | −17.5 | −1.8 | 16.9 | |
| BHPVA-2MZ | 22.3 | −17.0 | −16.8 | | 12.4 | | |
| PhPh-2MZ | 20.4 | −17.8 | −17.9 | −15.0 | −13.3 | −11.3 | −10.7 |
| PhPh-IMZ | 17.5 | −17.6 | −18.2 | −11.5 | −6.9 | | −0.7 |
| BHPPA-2E4MZ | 29.9 | −14.7 | −14.1 | −7.5 | 27.5 | | |
| BA-2E4MZ | 32.6 | −12.6 | −3.8 | | | | |
| APAA-2E4MZ | 42.2 | −18.2 | | 21.0 | | | |
| BHPAA-2E4MZ | 31.1 | −15.3 | −17.7 | −18.0 | 27.4 | | |
| BHPAA-2MZ | 25.1 | −18.4 | −18.6 | −15.7 | 24.5 | | |
| PhPh-2MZ-IMZ | 18.7 | −18.6 | −18.4 | −17.6 | −13.6 | −12.7 | −11.9 |
| BHPVA-2PZL | 33.8 | −19.0 | −17.7 | −16.7 | −14.2 | −11.9 | −8.9 |
| PhPh-2PZL | 31.3 | −19.2 | −19.0 | −18.3 | −18.0 | −17.0 | |
| BHPVA-DBU | 34.7 | −18.7 | −18.1 | −17.2 | −15.9 | −14.6 | |
| PhPh-DBU | 32.2 | −18.8 | −18.1 | −17.8 | −17.6 | −16.7 | |
| BHPVA-BDMA | 32.1 | −18.5 | −16.9 | −10.4 | 11.2 | | |
| PhPh-BDMA | 29.7 | −18.3 | −17.8 | −17.1 | −10.2 | −9.5 | −8.7 |
| BHPVA-DMP30 | 23.6 | −17.8 | −17.1 | −17.3 | −17.2 | −16.9 | −16.9 |
| PhPh-DMP30 | 21.6 | −17.4 | −16.7 | −16.6 | −14.7 | −13.8 | −13.8 |
| Comparative Examples | | | | | | | |
| PDCA-IMZ | | −18.7 | −18.8 | −18.8 | n/a | −14.4 | |
| PDCA-C11Z | | −19.3 | −18.5 | −17.4 | −16.2 | −10.6 | |
| SA-2E4MZ | | −19.2 | −18.2 | −14.7 | −12.4 | −6.9 | |

A prepreg can be manufactured by casting the mixture of the above examples on a polyolefin film in a thin sheet of approximately 0.5 mm thickness. The cast film is then combined with a carbon fibre unidirectional fabric of 268 g/m$^2$ in between a set of compression rollers to produce the prepreg.

The invention claimed is:

1. A clathrate composition containing a host component (A) and a guest component (B),
   i. the host component (A) being defined by
      a. the formula (I):

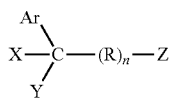

(I)

where n is 1
Ar is a substituted or unsubstituted aryl group
X is independently selected from H, OH, a substituted or unsubstituted alkyl group and a substituted or unsubstituted aryl group;
Y is independently selected from H, OH, an aryl group, a substituted or unsubstituted alkyl group, and a substituted or unsubstituted aryl group;
wherein two or more of X, Y and Ar are an aryl group with a hydroxyl sub stituent;
wherein R is a divalent substituted or unsubstituted aliphatic hydrocarbyl group
and
wherein Z is COOH; and
  b. the guest component (B) is selected from at least one compound selected from the group consisting of compounds represented by formula (II):

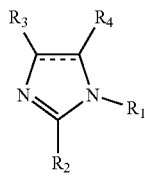

(II)

in which $R_1$ each independently represents a hydrogen atom, a $C_{10}$-$C_{10}$ alkyl group, an aryl group, an arylalkyl group, or a cyanoethyl group, and $R_2$ to $R_4$ each independently represent a hydrogen atom, a nitro group, a halogen atom, a $C_1$-$C_{20}$ alkyl group, a $C_1$-$C_{20}$ alkyl group substituted with a hydroxy group, an aryl group, an arylalkyl group, or a $C_1$-$C_{20}$ acyl group; and a part with a dashed line represents a single bond or a double bond.

2. The composition according to claim 1 in which the guest component has a triggered release from the host component.

3. The composition according to claim 2, wherein the host component (A) contains a single carboxylic acid or carboxylic acid ester group.

4. The composition according to claim 3 in which the host compound is 4,4'-bis(p-hydroxyphenyl)valeric acid (BHPVA).

5. A clathrate composition containing a host component (A), comprising 2,2'-bis(p-hydroxyphenyl) propionic acid (BHPPA);
and a guest component (B), the guest component (B) is selected from at least one compound selected from the group consisting of compounds represented by formula (II):

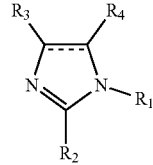

in which $R_1$ each independently represents a hydrogen atom, a $C_1$-$C_{10}$ alkyl group, an aryl group, an arylalkyl group, or a cyanoethyl group, and $R_2$ to $R_4$ each independently represent a hydrogen atom, a nitro group, a halogen atom, a $C_1$-$C_{20}$ alkyl group, a $C_1$-$C_{20}$ alkyl group substituted with a hydroxy group, an aryl group, an arylalkyl group, or a $C_1$-$C_{20}$ acyl group; and a part with a dashed line represents a single bond or a double bond.

* * * * *